Patented Apr. 23, 1946

2,398,869

UNITED STATES PATENT OFFICE 2,398,869

ALKYLATION OF HYDROCARBONS

Ernest W. Thiele, Chicago, Ill., assignor to Standard Oil Company, Chicago, Ill., a corporation of Indiana Application July 28, 1939, Serial No. 287,099

6 Claims. (Cl. 260—683.4)

This invention relates to an improved process for the catalytic alkylation of isoparaffins with olefins and relates more particularly to an improved alkylation process in which the catalyst is a complex formed by the action of aluminum chloride on a hydrocarbon material.

It is an object of this invention to provide an improved process wherein isoparaffins are alkylated with olefins in the presence of an aluminum chloride-hydrocarbon complex for the production of hydrocarbons suitable for fuel in automotive engines. Another object of this invention is to provide a process wherein mixtures of isoparaffins and olefins are subjected to the catalytic action of aluminum chloride-hydrocarbon complex in order to form hydrocarbons of gasoline boiling range and higher, and in which a part or all of the hydrocarbons that could be suitably utilized in motor gasoline are recycled to the catalytic process as a part of the feed stock to make an aviation "safety fuel." A still further object of this invention is to provide an improved alkylation process in which the feed stocks are utilized to the greatest possible advantage for the production of hydrocarbons suitable for motor fuels, aviation fuels, etc. characterized by high octane numbers. Another object of this invention is to provide a process for the production of aviation fuels, of ordinary boiling range, and for the production of an aviation "safety fuel." Still further objects and advantages will become apparent as the description of my invention proceeds.

The accompanying drawing illustrates schematically one preferred flow diagram of a system for carrying out my process.

My preferred catalyst comprises a complex formed by the action of an aluminum halide, and preferably anhydrous aluminum chloride, on a hydrocarbon material, preferably in the presence of hydrogen chloride as a promoter. Although the complex formed by the reaction of anhydrous aluminum chloride or aluminum bromide with olefins or with aromatics may be used I prefer to use the complex formed by the action of aluminum chloride on paraffinic or naphthenic hydrocarbons or mixtures of such hydrocarbons. It has been discovered that a catalyst of greater activity, the effect of which on the reacting hydrocarbons can be more easily controlled, is produced by the reaction of aluminum chloride or aluminum bromide with a saturated hydrocarbon than by the reaction of aluminum chloride or aluminum bromide with unsaturated hydrocarbons.

The exact nature of the complex is not known but it is believed that the saturated hydrocarbon does not replace one of the halogens nor does the saturated hydrocarbon add to the aluminum halide in such a form that it can be recovered unchanged as may be done, for example, with the aluminum chloride-aromatic complex. A complex prepared from an aromatic-free light distillate from a Mid-Continent crude and anhydrous $AlCl_3$ gave the following analysis:

| | Weight per cent |
|---|---|
| Aluminum | 12.5 |
| Chlorine | 44 |
| Carbon+hydrogen | 43.5 |
| Atomic ratio Cl/Al | 2.7 |

In an effort to ascertain the chemical structure of this complex, a portion of it was carefully decomposed by adding water drop by drop with constant stirring, the products being collected in a water reflux condenser, a solid carbon dioxide-acetone tower, a gas absorption tube to remove HCl, and a permanent gas collector. The hydrocarbon layer was extracted with ether and the ether distilled from the hydrocarbon layer. The 45 volume per cent overhead from the distillation of the hydrocarbon had the following characteristics:

| | |
|---|---|
| Boiling range | 142° F.–553° F. |
| Refractive index $N_D^{20}$ | 1.3820–1.5377 |

The distillation revealed plateaus at 300° F. and again at 440° F., which fractions were characterized by pronounced terpene odors. The fractions showed varying degrees of unsaturation.

The complex may be prepared in any suitable manner and I have illustrated it as being prepared by an aluminum chloride treatment of a light naphtha. In carrying out this operation it is preferred that the naphtha be aromatic-free since, as has been pointed out, a less effective catalyst is formed by the interaction of aluminum chloride and aromatic hydrocarbons. In addition the aluminum chloride treatment of a light naphtha, particularly a light naphtha of low antiknock properties, such as a straight-run gasoline, will cause the isomerization of at least a portion of the hydrocarbons present thereby producing branched-chain paraffins desirable for use as an antiknock motor fuel and will also produce isobutane which, as will be pointed out later, is admirably suited as one of the reactants for my process. Throughout this specification and claims the terms "aluminum chloride-saturated hydrocarbon complex," "aluminum chlo-

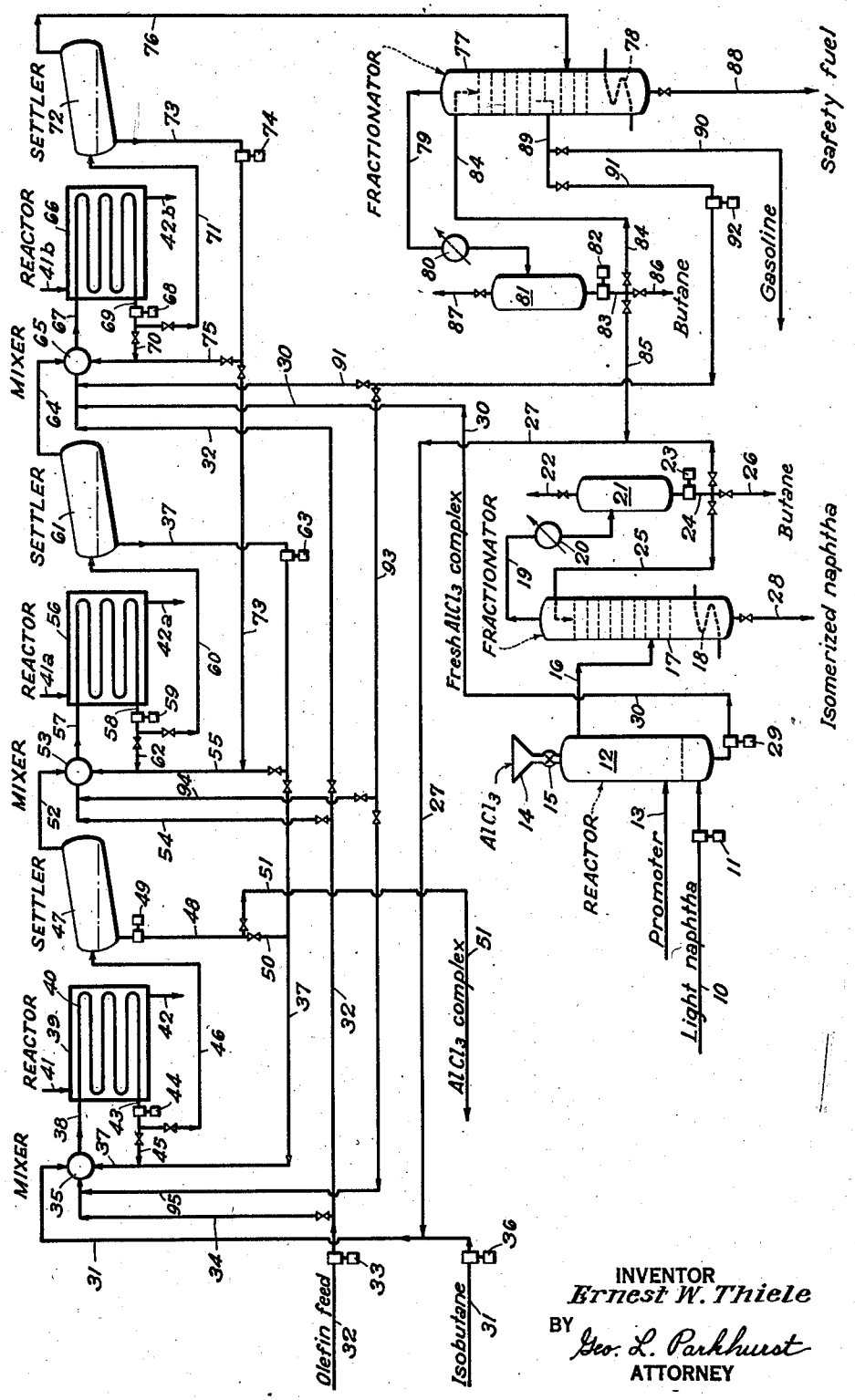

paraffin complex settles out and separates from the hydrocarbons. The complex is withdrawn through line 48 by means of pump 49 and may be recycled to mixer 35 through valved line 50 which joins line 37 or, if it is no longer sufficiently active to promote the alkylation reaction, it may be withdrawn through valved line 51. It may be desirable to recycle a portion of the complex which is not entirely spent as to akylation with the least spent catalyst from the previous reaction in order that it may be more fully utilized and to bleed a portion of it off through valved line 51 so that the volume of catalyst does not build up to an unwanted extent.

The alkymer and the unreacted hydrocarbons pass overhead from settler 47 through line 52 to mixer 53 where they are contacted with additional olefins from valved line 54 which joins line 32. Partially spent catalyst is added to mixer 53 through valved line 55 and the intermingled catalyst and hydrocarbons are directed to reactor 56 through line 57 wherein conditions similar to those in reactor 39 are maintained. Temperature is controlled as in reactor 39 by fluid which enters through line 41a and is discharged through line 42a. The alkymer plus any unreacted hydrocarbons together with the catalyst is withdrawn through line 58 and forced by pump 59 through valved line 60 to settler 61. A portion as in the previously described reaction may be recycled to the mixer 53 through valved line 62 which joins line 55. In settler 61 the hydrocarbons are again separated from the complex which is withdrawn through line 37 and directed to mixer 35 by means of pump 63. A portion may also be recycled to mixer 53 through line 55.

The alkymer and any remaining unreacted hydrocarbons pass from settler 61 through line 64 to mixer 65. Olefins are added through line 32 while fresh aluminum chloride-complex is added through line 30 to mixer 65 wherein all streams are thoroughly agitated and directed to reactor 66 through line 67. Again similar conditions of pressure and temperature are maintained, the temperature control being regulated by fluid which enters through line 41b and discharges through line 42b. The reaction product and the catalyst are withdrawn by means of pump 68 in line 69 and as before, a portion is returned to mixer 65 through valved line 70 if desired. The remainder of the products in line 69 passes through valved line 71 to settler 72 wherein a separation between hydrocarbons and the catalyst is again made. The catalyst is withdrawn through line 73 and forced by pump 74 to mixer 53 through valved line 55. A portion may also be recycled to mixer 65 by line 75. Though three stages are shown, the actual number of stages may be more than three.

The alkmer plus any remaining unreacted hydrocarbons passes overhead through line 76 to fractionator 77 equipped with bottom heating means 78. In fractionator 77 a separation is made between the normally gaseous hydrocarbons, the alkymer of gasoline boiling range and alkylated product heavier than gasoline. The gasoline cut may correspond to aviation or motor gasoline. The normally gaseous products pass overhead through line 79 and cooler 80 to reflux drum 81 wherein the separation is made between hydrocarbons having 4 carbon atoms per molecule and hydrocarbons having less than 4 carbon atoms per molecule and including any hydrogen which may be present. The gases lighter than the $C_4$ hydrocarbons pass overhead through valved line 87 while the "butane" cut is withdrawn by pump 82 through line 83. A portion is recycled through valved line 84 to fractionator 77 to act as reflux in aiding the separation of the products in the fractionator if desired. If there is present a considerable amount of isobutane part or all of this may be returned to the process through valved line 85 which joins line 27. If the chief constituent of the "Butane" cut is normal butane then this may be withdrawn through valved line 86 and used for blending with butane deficient motor fuels or as a fuel or directed to an isomerization reactor (not shown) to convert the normal butanes to isobutanes for use in the process.

The usual product from alkylation of isoparaffins, particularly the alkylation of isobutane with normally gaseous olefins, is a highly branched paraffinic hydrocarbon having a very high octane number and, therefore, is particularly suitable for use as an aviation fuel or as a blending fuel for raising the octane number of motor fuels deficient in antidetonating characteristics. The product consists primarily of hydrocarbons having 6, 7 and 8 carbon atoms per molecule (depending upon the olefins used) although there may be present a certain amount of 9 and 10 carbon atom hydrocarbons. In place of the usual so-called isooctane (2,2-4 trimethyl pentane) for aviation fuels it may be desirable to use a "safety fuel." This comprises a very high octane number hydrocarbon having a higher boiling range than is usual in aviation fuels, and preferably a flash point above 100° F. This fuel is advantageous in the event that it should become necessary to "dump" the gasoline from the airplane in emergency landings since the lower volatility and high flash point of the "safety fuel" will lessen the danger of fire and explosion. This is particularly true for airplanes which may be forced to make emergency landings on water where the gasoline spreads much more easily and constitutes a somewhat greater danger to the aircraft.

In the course of my alkylation process it is quite possible that the alkylation reaction has proceeded beyond the simple alkylation of isobutane with the olefin and that the olefins have alkylated the alkymer which will, of course, contain the necessary active tertiary carbon atoms. For this reason, there may be present hydrocarbons of higher boiling range than are suitable for aviation gasoline but which are admirably suited for use as an aviation "safety fuel." To obtain a higher yield of "safety fuel" the alkymer of low or intermediate boiling range may be recycled to the alkylation process for further contact with the olefinic feed. The alkymer of motor fuel or aviation fuel gasoline boiling range is withdrawn from fractionator 77 through line 89 and a part or all of it may be withdrawn for use as an aviation fuel or motor fuel through valved line 90 and may, if desired, be blended with the isomerized naphtha from line 28. On the other hand, a part or all of it may be directed through valved line 91 and forced by pump 92 to mixer 65 wherein it is commingled with the olefinic gases from line 32 and with any unreacted olefinic gases from line 64, and contacted with fresh aluminum chloride-saturated hydrocarbon complex to alkylate further the alkymer. Alternatively, it may be returned to mixer 53 through valved line 93 and valved line 94 which joins line 54 or to mixer 35 through valved line 95 which joins line 34. The proportion of alkymer of gasoline boiling range withdrawn for motor or aviation fuel purposes and the amount withdrawn for further alkylation will depend entirely upon the relative amounts of aviation gasoline and aviation "safety fuel" desired. The "safety fuel" may be withdrawn through valved line 88. In the event that the "safety fuel" alkymer contains alkymers too heavy for use in this connection, a further distillation may be made or the "safety fuel" alkymer of the desired boiling range may be withdrawn as a side stream from fractionator 77, the heavy bottoms being withdrawn for discard through line 88.

One advantage of this stepwise process lies in the control of the olefin to paraffin ratio of the reactants. There has been illustrated in my process a separation of reactants and catalyst between steps, but it is possible to use a continuous process without intervening separation, the olefin stream being introduced at various points.

It is also possible to introduce fractionators between each of the steps to separate the complex, the alkymer and the unreacted gases, the complex being directed to the preceding reactor, the gases to the succeeding reactor, and the alkymer withdrawn. This is not the most desirable method of operation from an economic point of view, since the cost of the additional fractionation might be considered excessive.

This process illustrates an improved method of utilizing to the fullest extent the catalytic activity of my catalyst and the production of two desirable fuels particularly suited for aviation gasoline.

I claim:

1. In a countercurrent alkylation system which comprises a plurality of associated mixing, reacting and settling zones, the method of effecting the alkylation of iso-paraffinic hydrocarbons with olefinic hydrocarbons which comprises reacting a substantially aromatic-free naphtha with aluminum chloride to form a complex, introducing the complex into the mixer of the last zone and thence passing it through the reactor of the last zone and settler of the last zone to the mixer, reactor and settler, respectively, of the preceding zone, introducing a mixture of isoparaffins and olefinic hydrocarbons first through the mixer, reactor and settler of the preceding zone and thence through the mixer, reactor and settler of the last zone, fractionating the hydrocarbons from the settler of the last zone into a motor gasoline fraction, an aviation safety fuel and a lighter hydrocarbon fraction, respectively and returning at least a part of said motor gasoline fraction to one of said mixers.

2. The method of claim 1 in which additional olefinic hydrocarbons are introduced in succeeding stages.

3. In a continuous process for the production of aviation safety fuel by the alkylation of isoparaffinic hydrocarbons with normally gaseous olefinic hydrocarbons in the presence of an aluminum chloride-saturated hydrocarbon complex, the steps comprising passing said isoparaffinic hydrocarbons and said normally gaseous olefinic hydrocarbons to a first stage in contact with partially spent complex from at least one subsequent stage under alkylating conditions, separately recovering treated hydrocarbons and spent complex from said first stage, passing said treated hydrocarbons and additional normally gaseous olefinic hydrocarbons to a subsequent stage in contact with an aluminum chloride-saturated hydrocarbon complex less spent than said complex in said first stage, said subsequent stage being maintained under alkylating conditions, separately recovering treated hydrocarbons and spent catalyst from said subsequent stage, directing said last-mentioned recovered complex to said first stage, fractionating said last-mentioned recovered treated hydrocarbons into an aviation safety fuel fraction, a motor gasoline fraction, and a normally gaseous fraction, and returning said motor gasoline fraction to said subsequent stage for alkylation to aviation safety fuel.

4. In a continuous process for the production of aviation safety fuel by the alkylation of isoparaffinic hydrocarbons with normally gaseous olefinic hydrocarbons in the presence of an aluminum chloride-saturated hydrocarbon-complex, the steps comprising passing said iso-paraffinic hydrocarbons and said normally gaseous olefinic hydrocarbons to a first stage in contact with partially spent complex from a second stage under alkylating conditions, separately recovering treated hydrocarbons and spent complex from said first stage, passing said treated hydrocarbons and additional normally gaseous olefinic hydrocarbons to said second stage in contact with partially spent complex from a third stage under alkylating conditions, separately recovering treated hydrocarbons and spent catalyst from said second stage, directing said recovered complex to said first stage and passing said recovered treated hydrocarbons from said second stage with additional normally gaseous olefinic hydrocarbons to said third stage in contact with fresh aluminum chloride-saturated hydrocarbon complex under alkylating conditions, separately recovering treated hydrocarbons and spent complex from said third stage, directing said last-mentioned recovered spent complex to said second stage, fractionating said treated hydrocarbons from said third stage into an aviation safety fuel fraction, a motor gasoline fraction, and a normally gaseous fraction, and recycling said motor gasoline fraction to said third stage for alkylation to aviation safety fuel.

5. A process according to claim 4 in which said isoparaffinic hydrocarbon is isobutane.

6. A process according to claim 4 in which said isoparaffinic hydrocarbon is isobutane and said normally gaseous olefinic hydrocarbon is ethylene.

ERNEST W. THIELE.